United States Patent [19]
Prestridge et al.

[11] 3,939,395
[45] Feb. 17, 1976

[54] SYSTEM FOR CONNECTING AND DISCONNECTING POWER SOURCE TERMINALS TO A LOAD FOR TIME PROPORTIONAL TO THE CURRENT DRAWN BY THE LOAD

[75] Inventors: Floyd L. Prestridge; Harry G. Wallace, both of Tulsa, Okla.

[73] Assignee: Combustion Engineering, Inc., Windsor, Conn.

[22] Filed: Apr. 17, 1972

[21] Appl. No.: 244,394

[52] U.S. Cl. ............... 323/4; 204/305; 321/18; 323/18; 323/22 SC; 323/24; 323/39
[51] Int. Cl.² .......................................... G05F 1/56
[58] Field of Search ............ 307/133, 252 A, 252 B, 307/252 UA; 321/18; 323/4, 17, 18, 22 SC, 24, 39

[56] References Cited
UNITED STATES PATENTS

| | | |
|---|---|---|
| 3,400,324 | 9/1968 | Covert .................................. 323/17 |
| 3,439,253 | 4/1969 | Piteo .................................... 321/18 |
| 3,493,835 | 2/1970 | Hellmann ......................... 307/133 X |
| 3,551,786 | 12/1970 | Gulik .................................. 321/18 X |
| 3,601,686 | 8/1971 | Gautherin .......................... 323/24 X |
| 3,662,216 | 5/1972 | Hildebrant ............................ 323/17 |
| 3,700,923 | 10/1972 | Platzer .......................... 307/252 UA |

*Primary Examiner*—A. D. Pellinen
*Attorney, Agent, or Firm*—Arthur L. Wade

[57] ABSTRACT

The essential elements of the electrical system of a treater, or dehydrator, of produced oil well fluids are connected and physically oriented as mounted within the shell of the treater. The electrodes of the treater are energized from a line supply and establish electrostatic fields as a varying load on the electrical system. A control circuit is arranged to respond to the current demanded by the varying load and disconnect the load from the line supply in a predetermined program designed to protect the components of the system, yet reconnect the load and supply as frequently as practical.

7 Claims, 10 Drawing Figures

SYSTEM FOR CONNECTING AND DISCONNECTING POWER SOURCE TERMINALS TO A LOAD FOR TIME PROPORTIONAL TO THE CURRENT DRAWN BY THE LOAD

BACKGROUND OF THE INVENTION

1. Field of the Invention

The present invention relates to control of the generation of a plurality of electrostatic fields through which a mixture of water and oil is flowed for sequential exposure to the fields as forces for coalescing droplets of the water into sizes great enough for their effective gravitation from the oil. More particularly, the invention relates to regulation of a form of d.c. voltage applied to an electrode system suspended in the mixture to generate the plurality of fields which will first function as aa field generated by a.c. voltage and secondly as a field generated by d.c. voltage which will cause an ordered migration of dispersed water droplets relative to the electrodes.

2. Description of the Prior Art

The expanded synopsis of the paper titled "Theoretical Basis of Operation of Apparatus for Electric Dehydration and Electric Desalting of Oil Emulsions" by G. M. Panchenkov, L. K. Tsabek and V. Papko, submitted at the VIII World Petroleum Congress in Moscow, makes a state of the art declaration which has apparent validity.

"The world publications—both journals and patents—comprise a vast amount of various suggestions for design of electric dehydrators, frequency, geometry and intensity of electric fields. But, in most cases, the offered designs have no scientific-theoretical base."

Otherwise, the synopsis is a broad, somewhat confusing, reference to the paper. The impression remains that a scientific-theoretical basis may have been formulated, but practical suggestions and explanations are lacking in this work.

When it comes to locating simple, comprehensive, satisfactory explanations of how coalescence is brought about in electrostatic fields, the literature is quite broad and indefinite. The phenomenon seems to be more often simply observed rather than comprehensively explained.

F. G. Cottrell is generally credited with the first practical application of electrostatic fields to dehydration (treatment) of crude oil emulsions. His pioneer U.S. Pat. 987,115 (1911) claimed the water particles "are subject to electrostatic forces dependent upon the relative potentials and dielectric constants of the materials in contact and caused to coalesce into masses" easily removed by settling or centrifuging.

Cottrell set the pattern for explanation of the relation between coalescence and emulsions. Most subsequent explanations remained about as vague. C. G. Sumner's 5th Edition of Clayton's "The Theory of Emulsions and Their Technical Treatment", Chemical Publishing Co., Inc., 212 Fifth Avenue, New York, 1954, stated at page 583:

"The theory underlying the Cottrell process and its modifications is that the emulsion serves as a multitude of electrical condensers, the electrodes or poles being the water globules and the continuous oil phase serving as the dielectric. Under the influence of a high-potential alternating field the charged water particles rupture the enveloping oil films and coalesce, forming larger drops."

Subsequent cinematographic observation gave enough backing to this explanation to keep it from serious challenge— and probably much additional investigation. In all events, subsequent workers in this field usually employed large a.c. voltages, giving little or no practical attention to the use of d.c. voltage. This type of limited, parochial, views of a phenomenon in oil field technology is not uncommon.

The configuration of two electrodes within an emulsion, one electrode being grounded, has long been assumed to generate a sufficiently effective electrostatic field with a.c. voltage applied to the ungrounded electrode. Undeniably, the force generated by this field will resolve emulsions; however, this force appears inefficient.

The literature listed in Chapter 9 — Demulsification — of Emulsions: Theory and Practice, 2nd Edition by Paul Becker, Van Nostrand - Reinhold Books, New York, is impressive. However, it now appears, in accordance with the expanded synopsis of the Russian paper, the workers in the art have only searched empirically for improvement with various electrode-grid shapes, horizontal and vertical arrangements for the electrode-grids and various voltage levels. The result obtained by the electrostatic fields established by a.c. voltage upon water particles suspended in oil charging, or polarizing, the water droplets under the Cottrell theory, appears to be both random and inefficient. It has now been discovered that an electrostatic field generated between electrodes to which d.c. voltage is periodically applied brings about a surprising result. The water droplets in the field migrate back and forth between the electrodes in a well-ordered pattern, growing larger and gravitating to collect below the electrodes in a body.

The work of Siebert and Brady with direct current is evidenced by U.S. Pat. 1,290,369 (1919). However, d.c. voltage applied periodically to electrodes brings about an ordered migration of dispersed water droplets which has surprisingly enhanced their coalescence in contrast to the results of applying a.c. voltage solely under the Cottrell theory. Specifically, voltage applied periodically to a pair of electrodes suspended above a grounded water-emulsion interface generates a series of electrostatic fields. The field generated between each electrode and the interface is quite different from the field generated between the electrodes. The oil-water mixture can be moved sequentially through these different fields and become thoroughly dehydrated by the effective coalescence of the water droplets and their consequent gravitation.

The theory on which the present disclosure of the electrostatic fields is founded includes a specific concept of the structure of a molecule of water as a constituent of a droplet of water. It is a generally accepted fact that individual molecules within a water droplet have a slight electrical dipole, i.e. the negative and positive charges are not concentric. Despite the existence of the molecule dipoles, their droplets are neutral.

The present concept includes the usual droplet of water in situ as containing ions, or even free electrons. When this droplet is placed within the unidirectional electrostatic field between two electrodes to which d.c. voltage is applied, the dipoles are accentuated and aligned with the field. The alignment is followed by physical movement, or migration, toward the near electrode.

In theory, the water droplet will physically move to the near electrode and remain there. However, it has been observed that as these droplets approach the electrode, they are suddenly repelled and migrate toward the opposite electrode where the attraction-repulsion pattern is repeated. The end result is a zig-zag downward course for these droplets during which they are directed to collide with other droplets, causing their progressive coalescence.

A first explanation of initial attraction, and subsequent repulsion, between droplets and electrodes, relies upon the presence of the ions and free electrons in each droplet. As the water molecules align to form a stronger dipole, the droplet is attracted to the near electrode, and the dipole moment becomes increasingly strong. It is now that the negative ions and electrons are attracted to the positive end of the dipole and the positive ions to the negative end. These ions and electrons at one end of the dipole form a shielding charge on the surface of the droplet with the same polarity as the near electrode. This charge on each end shields the dipole charge of that end and the droplet is consequently repelled toward the opposite electrode.

The attraction, followed by repulsion, of the water particles, or droplets, form an orderly migration from electrode to electrode. Not all droplets go the same direction at the same time, and directed collisions occur. With the collisions between droplets occurring at the time when opposite charges of their dipole face each other, the droplets are attracted to each other by their unlike charges into combining, or coalescing.

A second explanation of initial attraction, and subsequent reupulsion between droplets and electrodes, also relies upon the presence of the ions and free electrons in each droplet. Because of the electrical dipole, the water droplets are orientated and begin to drift because of proximity to an electrode of a particular potential and polarity. The strength of the electrostatic field on the dipole, because of the charge on the nearest electrode, increases so rapidly, relative to the droplet's ability to accelerate, that electrons are either added to or stripped from the droplet. This change of electron inventory results in the droplet developing the same charge as the nearest electrode and, accordingly, being repelled.

This explanation accounts for the initial motion of the water droplets toward an electrode and their subsequent repulsion therefrom. Further, following this second explanation, the water droplets approaching one another would now be oppositely charged and have strong attractive forces between them which direct collision and coalescence.

Both of the foregoing explanations of the movement of water droplets in the unidirectional field have been carefully considered. Neither explanation appears generally favored, and the validity of the claims to the invention would not appear to depend upon a choice between these explanations.

Under either of the foregoing explanations, or one yet to be developed, the results of the disclosure are evident in the actual reduction to practice. a unidirectional field contributes to the results. In establishing the unidirectional field, certain guidelines should be understood.

The d.c. voltage is carefully and fully regulated in its periodic application to the electrodes. Within this generalization, it is understood that the d.c. voltage may be generated by rectifying a.c. voltage, either half or full wave. Each of the half cycles of voltage is considered aa pulse of voltage. A group of these half cycles, applied at intervals, also constitutes a pulse. Further, any form of d.c. voltage applied to the electrodes at intervals through a form of switch, mechanical or electrical, is within the scope of the definition of pulsating. The broad guideline is that the voltage applied to electrodes to establish the unidirectional electrostatic field between them is applied periodically, at intervals or in pulsations.

Within the group of power sources available to generate a.c. voltage for rectification, two basic control systems have been used to regulate the source outputs by use of solid state devices. The first of these systems is termed phase shifting, or delayed firing. The second system is termed zero-switching with cycle skipping.

In the first system, a solid state control device (preferably an SCR or TRIAC) is placed in series between the power source and the load. These solid state electronic switches are caused to conduct (turn on) at some time after the beginning of each half cycle of the a.c. voltage passed from the source to the load. This interval of time, after the beginning of each half cycle, is set by the load demand which applies the control, or gate, voltage to turn on the SCR or TRIAC. The longer the interval, the less power applied to the load.

This phase shifting, or delayed firing, system appears ideal, for the gate voltage can be generated to turn on the solid state electronic switches with great precision. However, there are many problems with this sytem.

By turning on the solid state switch after the beginning of a half cycle, the resulting passed voltage wave form is provided with a steep leading edge. When this voltage is applied to the primary of a transformer, large spikes of voltage may be generated in the secondary because of this wave form. These large spikes often overload the transformer and other components, causing their rapid deterioration. This voltage spike generation is not the only problem of this approach to regulation, but is is one of the more evident and severe. U.S. Pat. 3,535,614 discloses a system of regulation of this type, but does not teach how to overcome this problem.

SUMMARY OF THE INVENTION

The present invention approaches the regulation problem of the prior art by simply disconnecting the power source from the load for intervals of time demanded by the load conditions. This approach may be viewed as relatively unsophisticated, compared with the delayed firing system but the simplification in structure to embody this approach is very attractive.

The present invention contemplates controlling the connection of an a.c. voltage power source to a load which varies. The current drawn by the load is the index to variations in the load. This current is detected and when it exceeds a first predetermined value, disconnection is programmed to occur a first time interval thereafter.

The invention next provides for the disconnection to continue a second time interval which is proportional to the magnitude by which the load current exceeded that first predetermined value. Reconnection is then programmed and the invention may provide that even the first half cycle of the source voltage is applied to the load at zero-crossing so a steep transient is avoided. Certainly, the invention provides that no continuous series of steep transients are applied to the components of the system.

Upon recommendation, the load current may immediately exceed the first predetermined value. Again, the program provided by the invention is effectively implemented. A time delay in the program at this point maintains the connection to enable the initial output of the load to perform a measure of work. Hopefully, this measure of work will reduce the load demand. Then, if at the end of the second time interval the load current remains above that first predetermined value, disconnection again takes place for a length of time proportional to the magnitude of the load current above the first value. This program will then repeat until the load reduces to the range in which the power can be continuously applied.

The invention more specifically contemplates conductive fluid between electrodes connected to a rectifier system as a load in the output of a source of a.c. voltage with an arrangement which responds to the flow of current to the electrodes. When this current exceeds a first predetermined value, the source is disconnected from the electrodes for an interval of time whose length is proportional to the magnitude of the excess current. The source is reconnected at the end of the proportional interval of time. If the conductive path between the electrodes allows a current flow in excess of the first predetermined value established by the components of the system, the source is again disconnected for a proportional interval of time after the development of an electrostatic field by the electrodes which works to reduce the conductivity of the fluid. When the fluid between the electrodes limits the current flow to an acceptable range, the source and electrodes will remain continuously connected to generate thhe electrostatic field.

EMULSION-MIXTURE-DISPERSION

In the drawing disclosure, and its description, all reference to emulsion, mixtures of oil and water, and water droplets dispersed in a second liquid is to basically the same material. Breaking the bond between oil and water, and subsequent removal of water, is dehydration of the oil. This reduction of water content of mixtures is the ultimate objective of these embodiments of the invention.

"WET" vs. "DRY"

When referring to emulsions, mixtures or dispersions of water in oil, the terms "wet" and "dry" are sometimes used. These are relative terms which I wish to define more specifically for use in disclosing the invention.

The water in emulsions, mixtures or dispersions serves no useful purpose. As a matter of fact, water is costly to transport and is the cause of corrosion in the equipment of the system. Therefore, it is desirable to reduce the water content of produced oil to as low a percent as possible before transporting the oil to a refinery. Many customers for produced oil carefully specify the maximum percent of water they will accept.

It is theoretically possible to process all water from the system. Generally, it is practical to reduce the water content of produced oil to a fraction of a percent or even to a trace. Therefore, oil containing only 1 percent or less water will herein be termed dry.

On the other hand, any water above 1 percent in emulsion will be herein termed wet. However, the percentage of water in an emulsified condition is seldom greater than 10% of the total mixture of oil and water.

In this disclosure, the term wet emulsion will apply to oil and water mixtures in which the dispersed water is greater than one percent. Dry emulsion will have less water.

Other objects, advantages and features of this invention will become apparent to one skilled in the art upon consideration of the written specification, appended claims, and attached drawings, wherein;

FIG. 1

Figure 1:
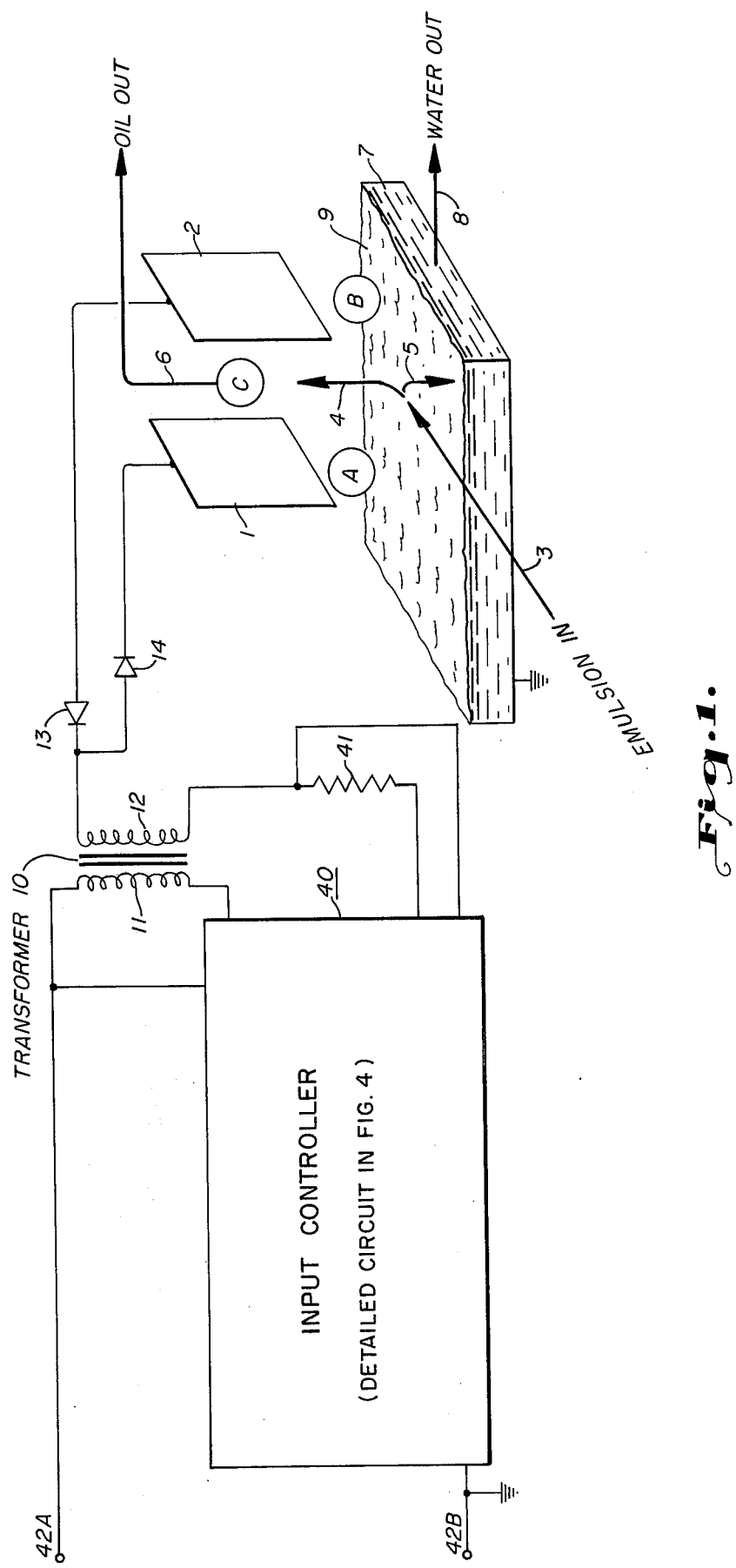
FIG. 1 is a somewhat diagrammatic, partial perspective, view of a portion of the flow pattern of production fluids through the shell of a dehydrating vessel and the electrical system in which the invention is embodied.

Before specifically disclosing the structure of FIG. 1 in which the present invention is embodied, consideration of selected background references will be helpful. U.S. Pat. 3,207,686, issued Sept. 21, 1965, to H. R. Jarvis et al., discloses the typical container 10 of electric treaters which is in the general form of a cylinder horizontally extended. The last compartment within this cylinder, through which fluids flow, is chamber 24. Within chamber 24, electrodes 80 and 81 are mounted, 81 being connected to high voltage transformer 90.

The incoming liquids are distributed by structures 58, along the bottom of compartment 24. The oil and water form an interface 70 above the distributors and below the electrodes.

The disclosure of Canadian Pat. 849,307, issued Aug. 18, 1970, to R. L. Pettefer, also features an electric treater with vessel 10 through which an oil well stream is produced. Treating compartment 30 is the last chamber within shell 10 and a part of the flow path.

The water body 36 has an interface disclosed with the oil-water mixture, but all liquids are not distributed with structure as disclosed in the Jarvis et al. patent. However, electrode pairs 32,33 and 34,35 are mounted above the interface and connected to transformer 31.

The primary reason for bringing attention to the disclosure of the Pettefer patent is the fact that the electrodes are thereby disclosed as extending vertically within compartment 30. Both disclosures illustrate the general thermal conditioning of the liquids prior to their flowing through the electrostatic fields generated by the electrodes energized by transformers. In all events, water coalesced and gravitated forms a body of water below the electrodes, the surface of which body may itself be regarded as an electrode at ground potential.

In presenting FIG. 1 of the present disclosure, illustration of conventional components of the electric treater have not been made because their form and function can be readily understood from the disclosure of the patents supra. It is even believed, in this particular situation, the details would tend to hamper a good perspective of the invention.

FIG. 1, therefore, has been developed by a somewhat diagrammatic representation of structure with which an embodiment of the invention is associated. Complete understanding of the invention may not be gained by everyone, but FIG. 1 is an adequate beginning for disclosing an overview of the invention.

Electrodes 1 and 2 are shown, arranged vertically and parallel to each other and to the flow of fluids, within the treater shell. The emulsion of the well stream is directed toward the electrodes along path 3 which is generally lower than the electrodes. The flow of the emulsion from path 3 is then directed upward along path 4. Any water droplets that coalesce to a size large enough to gravitate from the emulsion travel downward along path 5. After this treatment by exposure to the electrostatic fields generated by the invention, the oil of the emulsion continues upward along path 6 for delivery as the finished product of the process.

The water which is separated from the emulsion flowing along path 5, collects in a lower body 7. A controlled discharge of water from this body 7 is indicated as along path 8. The control of discharged water is exerted to maintain its upper surface 9 a predetermined distance below the electrodes.

The relative spatial relationship between the electrodes and the upper water surface now established, it can be generally appreciated that the electrostatic fields are located between the lower edges of the electrodes and the grounded surface of the water and between the electrodes. Field (A) and field (B) are beneath the electrodes and form an overlapping pattern of their lines of force between and beneath the electrodes. Due to the nature of the d.c. voltage applied, the overlapping fields midway between and beneath the electrodes will produce a field having the characteristics of a field similar to one generated by a.c. voltage.

The field (C), between the electrodes, is simply generated by d.c. voltage and behaves as such. However, the nature of the d.c. voltage applied gives this field (C) certain desirable characteristics.

The d.c. voltage applied to the electrodes is generated in pulses. When these pulses are applied to the two-electrode, water-surface system, the multiple electrostatic fields (A), (B) and (C) are established.

A generalized showing of a d.c. voltage source could be disclosed. The traditional "black box" could be used to represent a battery, a generator or a rectified transformer output. However, transformer 10 is presently the more practical form for a basic source of potential. Primary winding 11 is energized by an a.c. voltage and secondary winding 12 has its cyclical output rectified for application to electrodes 1 and 2.

The specific connection between secondary winding 12 and electrodes 1 and 2 produces the desired electrostatic fields. Through this connection, pulsating d.c. voltage is applied to the electrodes.

The secondary 12 is connected at one end to ground. The second end of the secondary is connected to the electrodes 1, 2 in parallel; rectifier 13 is one branch and rectifier 14 is the other branch. The rectifiers are oppositely poled. Through this arrangement, a voltage pulse is applied alternately to the electrodes and of opposite polarity to one another. The result is a pulsating d.c. voltage applied to the electrodes and the magnitude of this voltage between electrodes 1 and 2 is greater than both the RMS and peak voltage input from the secondary of the transformer.

COMPOSITE FIELDS

FIG. 1 discloses structure in which the invention is embodied, establishing a plurality of electrostatic fields with which water droplets in an emulsion are coalesced until they are large enough to gravitate and form a lower collection. Surprising success has been obtained in dehydrating oil field emulsions by passing them through the composite of fields (A) and (B) and then passing the emulsions through (C). A careful study of the results has been made and both general and specific conclusions about how these results are obtained have been drawn. Although not absolutely certain of the precision of the formulated theories, they are based on systematic research of the problem, and solution, and represent the best thinking on the matter at present.

It has been observed that coalescence of the water droplets of a wet emulsion is most effective under the force of an electrostatic field which is generated by voltage of comparatively low magnitude which has both directional and magnitude change. In contrast, a dry emulsion is more effectively treated by an electrostatic field generated by a steady-state voltage of comparatively high magnitude. Between the two extremes of emulsion condition, it is desired to have fields applied which vary from having an alternating characteristic to having a unidirectional characteristic.

The present disclosure provides a structural arrangement which progressively subjects an emulsion to electrostatic fields ranging from the alternating type to the unidirectional type. As the wet emulsion travels through an alternating type of field, it has its water content reduced. When the emulsion is dry, it is then passed through a unidirectional type of field for final dehydration. Electrostatic fields of both types are provided with the structure disclosed in FIG. 1.

Figure 2A:
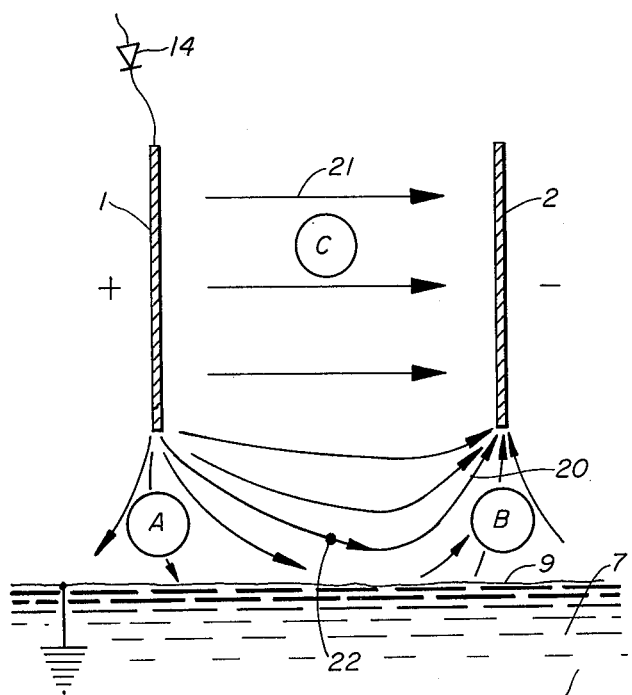
FIGS. 2a and 2b are diagrammatic side views of the electrodes of FIG. 1 and lines of force illustrating the electrostatic fields generated by the invention.
Figure 2B:
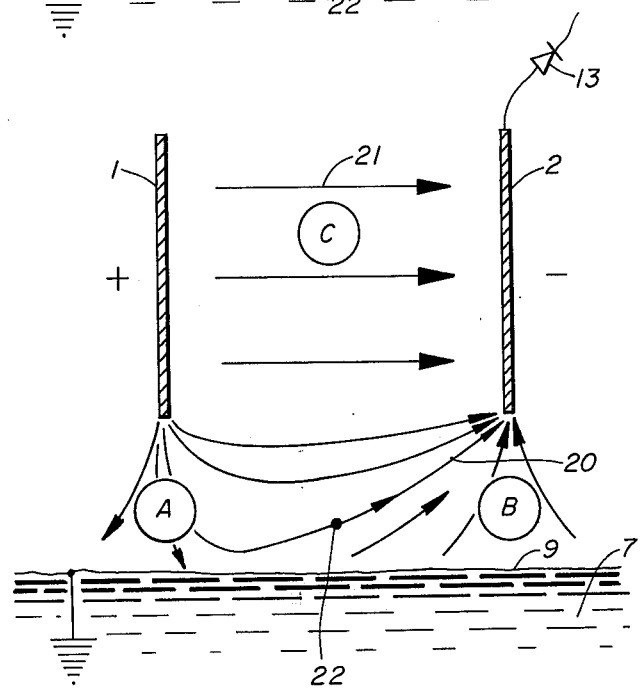

FIGS. 2a and 2b

Referring to FIGS. 2a and 2b, the electrodes 1 and 2 of FIG. 1 are disclosed from another angle of view. They are oriented in an elevation which lends itself to diagrammatic representation of the electrostatic fields generated by energizing the electrodes. Specifically, each electrode is viewed from its end, above water body 7 with its upper surface 9 interfacing with the emulsion flowing from path 3.

The electrostatic field, or fields, created between electrodes 1 and 2, and between the electrodes and water 7, are represented in FIGS. 2a and 2b by lines of force 20 and 21. Lines 20 occur in the region below electrodes 1 and 2 and lines 21 occur in the region between the electrodes.

Referring specifically to FIG. 2a, when diode 14 conducts, a positive (+) charge is developing on electrode 1, and at its peak this charge generates a field having lines of force 20. It is assumed that electrode 2 had previously acquired a comparable negative (−) charge and that a portion of it had leaked off due to leakage conduction in wet emulsion.

Referring specifically to FIG. 2b, when diode 13 conducts, a negative (−) charge is developing on electrode 2 and at its peak this charge generates a field having lines of force 20. It is assumed that electrode 1 had previously acquired a comparable positive (+) charge and that a portion of it had leaked off due to leakage conduction in wet emulsions.

Consider the lines of force 20 in each of FIGS. 2a and 2b with respect to their direction. A water droplet 22 is represented in FIG. 2a as having a line of force 20 directed generally downward upon the droplet. In FIG. 2b the line of force 20 is directed upon the same droplet, but in a generally upward direction.

An area below the electrodes could be depicted, or outlined, as the one in which the directional variation of lines of force 20 is the greatest. However, disclosure, in this detail, of the function of the electrostatic field does not appear warranted. It is sufficient to point out that water droplets, as represented by 22, in the region below electrodes 1 and 2 will have electrostatic forces placed upon them which vary in direction to some extent with the alternate pulsing of the electrodes.

It should be again emphasized that FIGS. 2a and 2b are not representative of a system in which the emulsion is so wet that a reversal of potential occurs at the electrode not being pulsed. In such emulsions, the direction of electrostatic forces on the water droplets will change nearly 180°. Additionally, FIGS. 2a and 2b do not illustrate the fact that the magnitude of the electrostatic forces at any given location below the electrodes may vary considerably between voltage pulse peaks. The variations in magnitude are greater, the more wet the emulsion.

AUTOMATIC ADJUSTMENT OF ALTERNATING FIELD STRENGTH

FIGS. 2a and 2b also help in understanding another feature of the electrostatic field generated beneath the electrodes. This feature is one of automatic adjustment relative to the more tightly emulsified oil-water which tends to collect in a layer at the interface 9.

As water droplets gravitate downward, they are expected to simply become part of body 7. However, stratification within the emulsion does develop. A gradient forms, of the water concentration, right down to the interface 9.

The layer at the interface is very conductive because of its high concentration of water content. Further, the layer tends to deepen, i.e. rise toward the lower edge of the electrodes. As this conductive layer thickens, moves upward, it causes the gradient of the field to increase. The shortened distance between the layer, effectively the ground electrode, increases the strength of the electrostatic field between this layer and the electrode above. The result is additional energy directed into the tight emulsion. Additional energy into the emulsion increases coalescence of the water droplets. This heightened "treating" reduces the tendency of the layer to grow. Therefore, automatic adjustment of this field strength is gained when required. This feature is a welcome addition to the basic function of the invention.

AUTOMATIC ADJUSTMENT OF UNIDIRECTIONAL FIELD : FIG. 3

An additional, automatic, adjustment of the fields is provided through the particular characteristics of the field between the electrodes. First, it is well known that when the emulsions passed between electrodes of electric treaters are very wet, they form a highly conductive path for the high voltage on the electrodes. Arcing readily takes place over this conductive path. To reduce this effect, it is desirable to control the voltage level on the electrodes during the period when very wet emulsions are passing between the electrodes.

Figure 3:
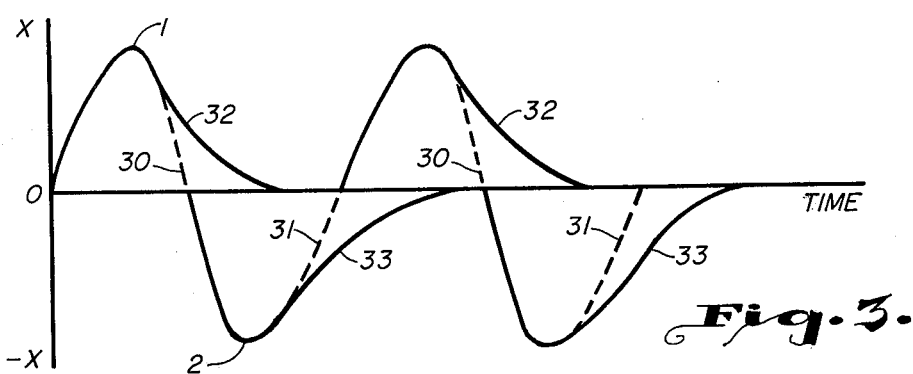
FIG. 3 is a graph of the voltage generated between the electrodes by the invention.

The application of pulsating d.c. voltage to electrodes provides automatic adjustment of the potential between electrodes with wet emulsions between the electrodes. FIG. 3 is established to disclose how this regulation automatically takes place. As the emulsion becomes more wet, the potential between electrodes reduces. An electrostatic field of maximum permissible strength remains, continuing to treat, but the voltage magnitude has been reduced and the corresponding tendency to arc between electrodes has reduced. As the emulsion becomes more dry, the voltage between electrodes increases, approaching substantially twice the value of the RMS value of the applied voltage.

With conductive water droplets dispersed in the liquid mixture between the electrodes, the voltage applied to the electrodes leaks off at a rate depending upon the degree of conductivity of the emulsion. In FIG. 3, the variation of voltage on the electrodes is indicated. The applied voltage across secondary 12 is, of course, a.c. in form and need not be illustrated.

The rectifiers 13,14 control the application of the a.c. voltage to electrodes 1,2. FIG. 3 illustrates the development of this voltage on the electrodes.

FIG. 3 assumes the emulsion between electrodes 1,2 is fairly wet. Therefore, the charge, or voltage pulse, leaks off fairly rapidly. If there were instantaneous leak-off, the voltage on electrode 1 would decrease along dotted lines 30 and the voltage pulse on electrode 2 would decrease along dotted lines 31. However, the emulsion is assumed to not be conductive to that degree and the voltage follows lines 32 on electrode 1 and along lines 33 on electrode 2.

Under the depicted pattern of voltage, the strength of the field (C) is directly proportional to the average value of the potential between 1 and 2. As discussed previously, a somewhat drier emulsion would prevent more leak-off of the applied voltage pulses and, therefore, generate a stronger field. Therefore, the disclosure provides a unidirectional field which adjusts in magnitude to militate against arcing between electrodes with wet emulsions. Then, with dry emulsion, the field increases in strength, increasing its treating capacity.

At this point, a restatement is made concerning the variable load of the disclosure. A series of fields is provided as a load for treating. Part of the load is a relatively weak alternating field for the wetter emulsions and a unidirectional field for the drier emulsions. In addition, the unidirectional field is self-regulated in strength and thereby avoids arcing, but provides enough strength for continued treating. These fields, generated by the electrical energy applied to the electrodes, form the complete variable load controlled by the present invention.

INPUT CONTROLLER

In FIG. 1, transformer 10 may be regarded as either the immediate source of a.c. voltage for the load or, more generally, means with which the power is connected to the load. More specifically, the output of the secondary 12 is rectified by 13,14 to supply power to electrodes 1 and 2. Operative variation of the d.c. potential between electrodes 1 and 2, due to the conductivity changes of the emulsion between the electrodes, has been observed. However, the disclosure has not, thus far, contemplated the emulsion becoming conductive to the degree that current flow in the circuit, and components of the circuit, threaten failure or breakdown of the components. Obviously, this overload condition is a threat which must be prevented by control of the electrical power supplied to transformer 10.

In FIG. 1, a black box 40 is indicated as controlling the connection of primary 11 to the line voltage supplied primary 11. Further, resistor 41 represents a current sensing device in association with the circuit of secondary 12 to produce a signal proportional to current flowing in secondary 12, to electrodes 1 and 2. As a first function through the circuits of 40, 41, the present invention disconnects transformer 10 from the line supply after the current in secondary 12 exceeds a first predetermined value. Continuous connection is maintained only so long as the current remains within a predetermined range.

It is an object of the present invention to disconnect the transformer from its line supply for an interval of time proportional to the magnitude by which the load current exceeds the first predetermined value. A section of the circuit of 40 is also arranged to automatically reconnect the transformer to the line supply at the end of the interval of time. If the overload still exists, manifested by the magnitude of the current flow detected by 41, disconnection again takes place and, again, for a time proportional to the magnitude of the overload current at that time. This connection and disconnection program repeats until the conductivity of the path between the electrodes reduces, or conversely, the impedance increases to within the range which will not destroy the system components.

Figure 4:
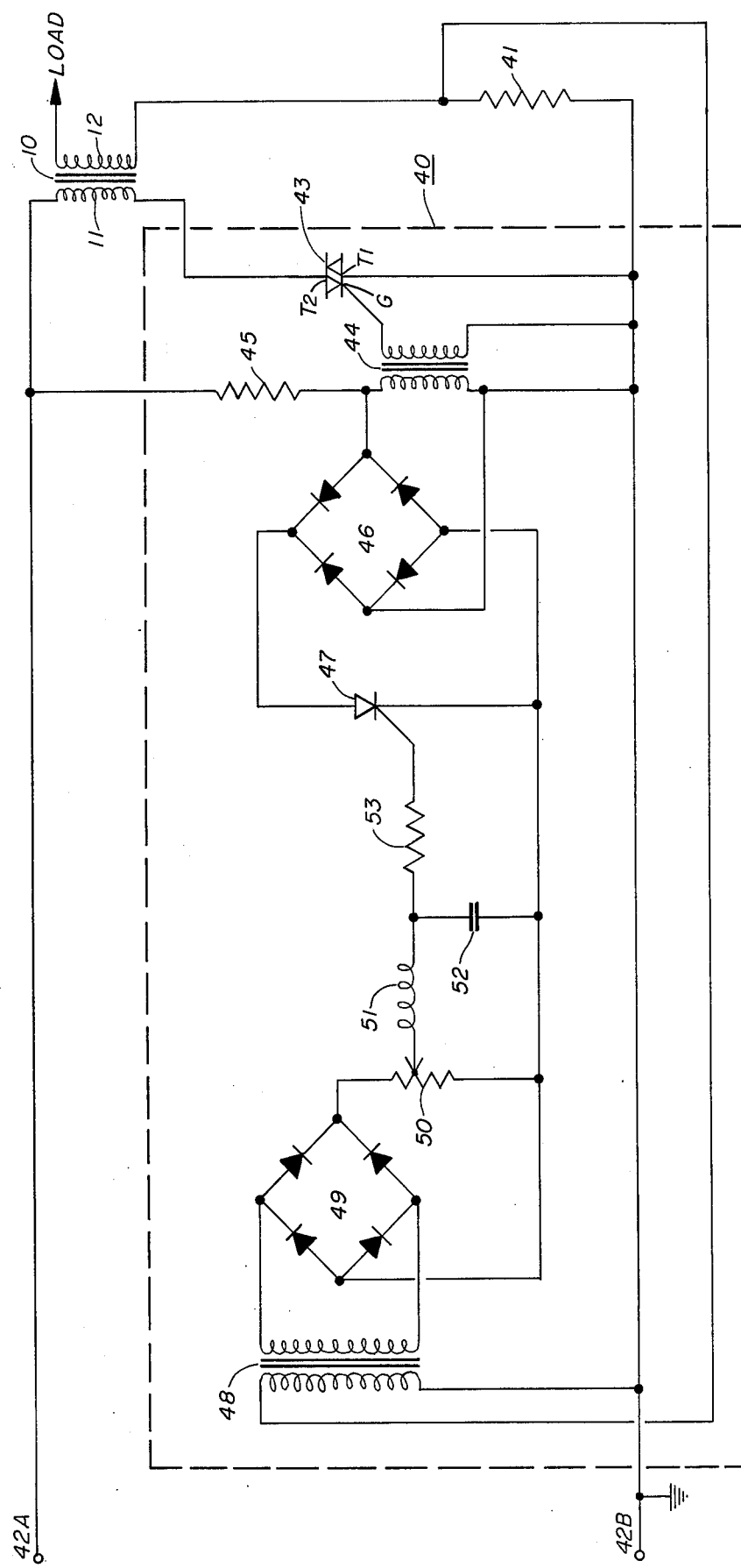
FIG. 4 is a schematic of the control for the electrical system in FIG. 1 and in which the invention is specifically embodied.

FIG. 4 discloses the structure of the circuit of controller 40 as it is connected between the transformer 10 and a line supply, responsive as it is to the current in secondary 12, detected at element 41. The line supply is represented by the horizontal lines at the top and bottom of the drawing having terminals 42A, 42B. The upper line with terminal 42A is connected directly to the upper end of primary 11 of transformer 10. The lower line, with terminal 42B, is connected to the lower end of primary 11 and in series with electronic switch 43. This switch 43 is preferably a solid state device. Comparatively recently, there has been developed a commercial form of switch designated TRIAC, which is suitable for this service.

All the variations of commercial form for the TRIAC have three terminals by which the unit is included in circuits. The control of the conductivity of the TRIAC is exerted with voltage applied between the two terminals designated T1 and T2. Terminal G is located between these terminals T1 and T2 and it is to this "gate" the control voltage is applied.

In developing nomenclature for the TRIAC, the term triggering voltage has been adapted for that voltage applied to the gate. Also, the term gate drive signal has been used for this voltage applied to the gate, the presence or absence of this voltage rendering the TRIAC on or off (conductive or non-conductive).

The gate drive signal, or triggering voltage, is generated within a so-called "drive circuit" within 40. Considered as an individual component, this drive circuit may take various forms. When supplying the gate voltage of a TRIAC, the circuit may be powered from the source voltage of terminals 42A and 42B or an independent source. Once rendered conductive by the proper gate voltage, the TRIAC will conduct at least one complete half cycle of the a.c. voltage of terminals 42A, 42B. If the gate voltage is applied for a time beyond a first half cycle of the a.c. voltage, the second half cycle conducted by the TRIAC will be of a polarity opposite to the first half cycle. The TRIAC will conduct for at least the complete second half cycle. Therefore, the TRIAC conducts for a one half and multiples of one half cycle of the a.c. source voltage. This is an inherent function of the TRIAC. However, to insure that the initial half cycle of the a.c. voltage passed to the load begins at zero-crossing, the invention also provides the gate voltage from the line supply of terminals 42A, 42B.

The specific form of drive circuit disclosed in FIG. 4 is presently preferred because its power requirements are relatively inexpensive and it is relatively simple to attain and maintain phase between the gate voltage and source to apply the source to the load at zero-crossing.

The immediate and specific generator of the gate drive signal for TRIAC 43 is transformer 44. The secondary of this transformer 44 is connected to the gate electrode, or terminal, of TRIAC 43. This generator-transformer is connected by its primary to a power source. IN FIG. 4, that power source is that of terminals 42A, 42B. Large resistance 45 is connected in series between the line and transformer primary. Thus, when the generator is effectively disconnected from the gate electrode, the full line voltage will appear across resistance 45.

When transformer 44 is employed as a generator of the gate drive signal, its primary is simply shorted to remove the signal. There is more than one circuit available to disconnect the generator from the gate electrode. The disconnect circuit of FIG. 4 comprises full-wave rectifier bridge 46 and electronic switch 47 for this function. This disconnect circuit effectively disconnects the generator from the gate electrode in response to an electrical signal from the delay section of the drive circuit.

Switch 47 is disclosed in the form of a silicon controlled rectifier (SCR) which has a gate to which an electrical signal in the form of a d.c. voltage is applied to render the SCR conductive (on). As disclosed, when SCR 47 is conductive, the primary of transformer 44 is shorted. The cascaded result is removal of the gate drive signal applied to the gate of TRIAC 43. Therefore, the control of the drive circuit, the output of transformer 44, and the connection-disconnection of transformer 10 to the line, rests upon generation of the d.c. voltage applied to the gate of SCR 47.

As previously pointed out, the basic function of the drive circuit is to provide a gate voltage for TRIAC 43. If the gate voltage is phased with the line voltage, as in FIG. 4, the TRIAC 43 connects the line voltage to the load (transformer 10) only at the beginning of a half cycle of the line voltage i.e. at zero. Thus, the electronic switch 43 will always zero-switch the connection between the line supply and the load transformer 11. The intervals of time the line and load are connected and disconnected are varied; the number of cycles of the source voltage skipped is established by other means. But, when the initial connection is made, it is made to present a sinusoidal form of line voltage to transformer 10 and obviate any destructive voltage spikes as found in the phase-shifting system.

The d.c. voltage applied to the gate of SCR 47 is generated in a time delay section of the drive circuit which, in turn, is supplied an input signal in the form of a rectified output of a transformer. Specifically, transformer 48 is disclosed as connected to primary element 41 which senses the current applied to the load on transformer 10. Of course, it is immaterial to the present invention whether the load current is sensed in the primary or secondary of load transformer 10. In either event, the load current is sensed and the voltage representative of this current applied to transformer 48. The output of transformer 48 is rectified by bridge 49 and applied across potentiometer 50.

The time delay section completes the electrical connection between transformer 48-bridge 49 and SCR 47. This delay circuit is to be consider in its two sub-sections and their necessary functions to achieve the control required over the TRIAC 43.

The first sub-section of the delay circuit is an inductive-capacitive type of circuit. This section is disclosed as comprising an inductance component 51 and a capacitor component 52. These components are specifically sized to delay the generation of the gate signal (voltage for the SCR 47) long enough to permit development of the charge voltage for the initial electrostatic field which is developed between the electrodes 1,2, connected to the secondary of transformer 10. Functionally, the greater the current in the secondary, the more quickly the gate voltage for the SCR 47 is attained.

The second sub-section of the delay circuit is resistive-capacitive type of circuit and is disclosed as comprising capacitor 52 and resistor 53. These components, as a unit, are sized to maintain the gate voltage for a length of time desirably proportioned to the magnitude of the feedback voltage, and current of the secondary of transformer 10. Functionally, the greater the secondary current, the longer the TRIAC 43 is turned off (the SCR 47 is on).

Specifically, the indicator 51 is connected by one end to potentiometer 50 and connected in series with capacitor 52. The resistor 53 is connected in series with capacitor at thhe junction of indicator 51 and capacitor 52, the other end of resistor 53 being connected to switch 47 to provide the electrical signal for switch 47.

The combined functions of the delay circuit subsections in reaction to the overload conditions of transformer 10 is that of turning off the power to transformer 10 for a length of time proportional to the magnitude of an overload, and, after reconnecting the power to transformer 10, maintaining the connection long enough to develop the load fully before a subsequent disconnection because of overload.

OPERATION OF THE CONTROLLER

Continuing reference to FIG. 4, the normal operative condition of the circuit is initially considered as having no overload applied to the system. The a.c. voltage power source is connected to transformer 10 through TRIAC 43.

At the beginning of each half cycle of source voltage, a portion of this voltage is applied through resistor 45 to the primary of transformer 44. This voltage is coupled to the secondary of transformer 44 and, therefore, appears on the gate terminal G of TRIAC 43. THis gate voltage is phased to cause TRIAC 43 to conduct and apply the voltage of the source to the primary of transformer 10. Power is thus applied to the load and the resulting load current passes through resistor 41 as also disclosed in FIG. 1.

The power applied to the load is represented by the voltage developed across resistor 41 and is proportional to the current through the load in providing this measure of the load current to the delay circuit. This voltage is coupled through transformer 48, rectified by bridge 49 and applied across potentiometer 50.

Potentiometer 50 provides an important adjustment function in the system. By means of this adjustment, any portion of the voltage can be selected for the control of the gate voltage of TRIAC 43. This structure enables an operator to predetermine the load current value at which disconnection of the source is initiated.

The voltage selected with potentiometer 50 is ultimately applied to control SCR 47. This voltage is characterized by circuit units 51, 52 and 53 which, in this combination, provide a programming function in this art.

As they are arranged in the FIG. 4 circuit, inductor 51 and capacitor 52 limit the rate at which a voltage develops and appears across capacitor 52. Once this voltage is developed across capacitor 52, it is stored, to discharge at a rate limited by the size of resistance 53.

The overview of circuit function at this point is that the potentiometer 50 voltage is developed as a gate, or control signal, voltage by the combined functions of 51, 52, 53 for SCR 47. The development is at a desired rate. The voltage is stored and maintained in storage for a length of time dependent upon the all-important magnitude by which the load current exceeded its so-called first predetermined upper value.

The gate voltage for SCR 47 is developed, as described supra, above its firing threshold value. Once SCR 47 begins to fire, or conduct, bridge 46 is shorted. As the output of bridge 46 is a reflection of the shorting of its input, the primary of triggering transformer 44 is shorted and the gate voltage of TRIAC 43 removed. The result is disconnection of the source from transformer 10.

Disconnection continues for an interval of time dependent upon the magnitude of the overload current. The potentiometer 50 voltage developed across capacitor 52 bleeds through resistance 53 as set forth supra. Now it is emphasized that this reduction of the gate voltage for SCR 47 may be for one or more cycles of the source voltage. However, this embodiment of the invention insures that when reconnection does take place, it occurs at the beginning of a half cycle of the wave form of the source voltage so that high voltage spikes across the transformer 10 are obviated.

When the voltage value for the gate signal of SCR 47 decays below the triggering level, the SCR will cease conducting at or near the zero voltage crossing point of the existing half cycle of line voltage. Then, at the beginning of the subsequent half cycle of the source voltage, SCR 47 will be non-conductive, bridge 46 and transformer 44 will no longer be shorted and TRIAC 43 gate voltage will be developed for normal, steady-state operation of the circuit.

If the overload current across resistance 41 still exists at the time of reconnection, the foregoing sequence of circuit functions of the embodiment will repeat. During each series of these overload sequences, the electrostatic field, as the load between the electrodes, will be developed for the finite period insured by the characteristics of inductor 51. A certain amount of work results on the cconductive fluid between the electrodes; there will be a degree of coalescing and removal of some water which will reduce the conductivity of the fluid. The connection and disconnection sequence continues automatically until either the work intervals are effective to reduce the conduction of the fluid or some other operating condition is altered to reduce conductivity to the level at which a steady, or operative, electrostatic field can be maintained.

Figure 5:
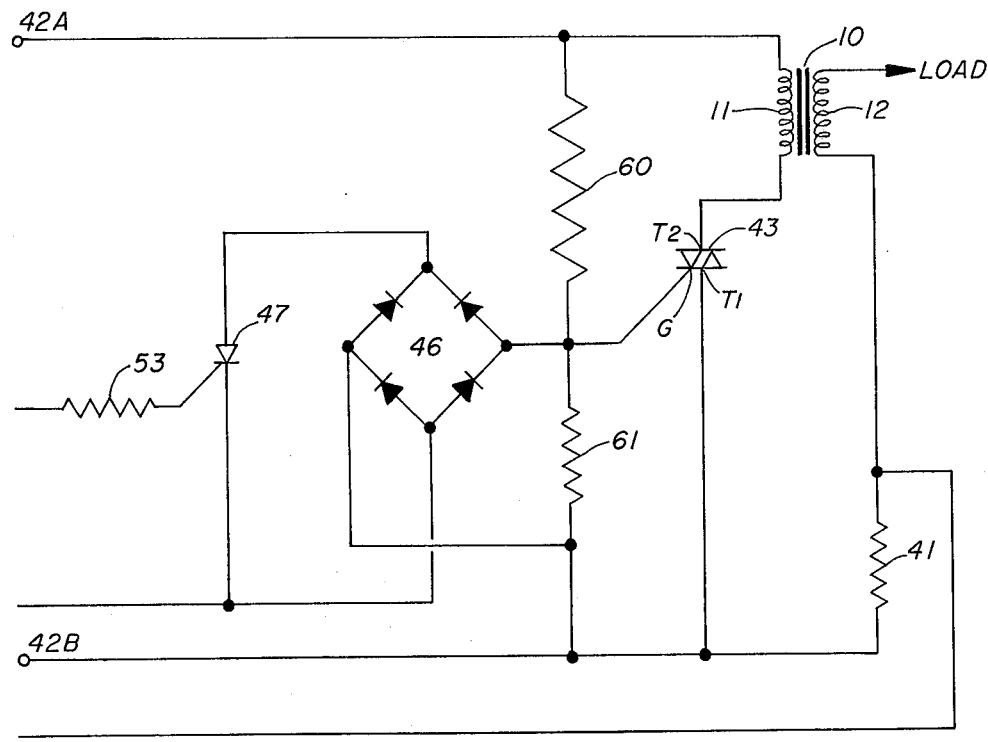
FIGS. 5 and 6 are schematics of alternate forms for circuits of FIG. 4.

It was stipulated, supra, that more than one circuit was available to "drive" the electronic switch 43. FIG. 5 is used to disclose a resistance network which could be substituted for trigger transformer 44. In FIG. 5, large resistor 60 and small resistor 61 are connected in series across the line supply and the gate of TRIAC 43 connected between them. This arrangement meets the basic requirements for properly phased voltage on the gate. However, the power loss in resistor 60 may be at least a severe thermal limitation of this drive circuit.

Figure 6:
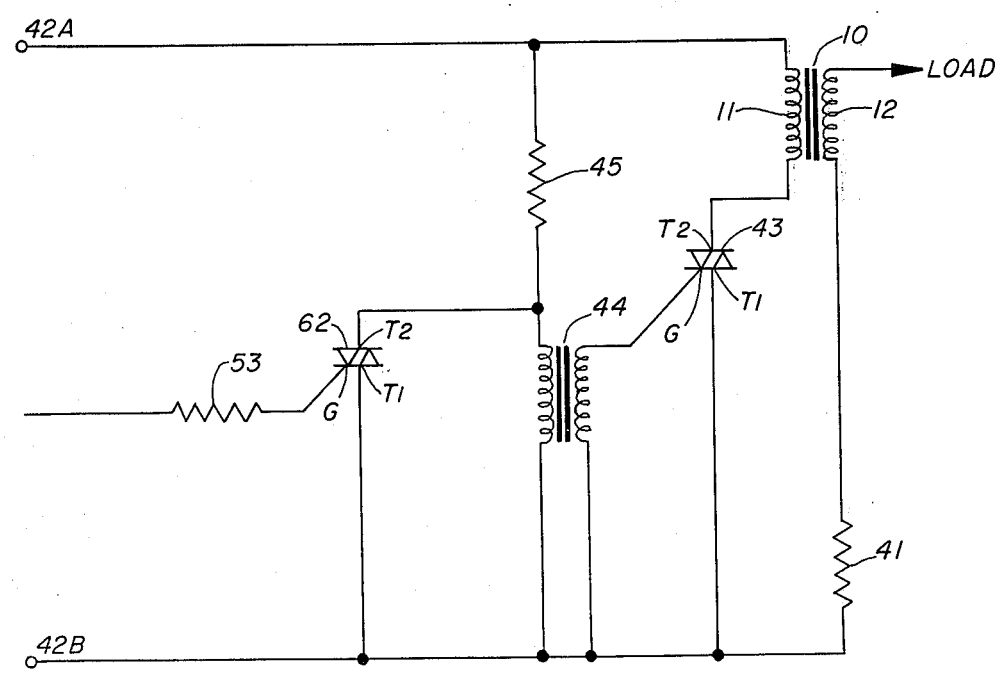

The drive section can also be given forms of shorting structure alternate to that specifically disclosed in FIG. 4. FIG. 6 discloses how a second TRIAC 62 can be connected across the primary of trigger transformer 44 which is a source of gate voltage for TRIAC 43. TRIAC 62 becomes an alternate to bridge 46 and SCR 47 in control of the output of transformer 44. Specifically, the gate of TRIAC 62 is connected to the output of the delay section circuit and therefore controls the conductivity of TRIAC 43. The disclosure of alternate forms for sections of the gate drive circuit provides a basis for a broad definition of this structure within the unique combination whose function is to connect and disconnect the line supply to the load circuit without the disadvantages of the phase shifting type of power control.

All of the foregoing embodiments of the invention are disclosed with the gate of TRIAC 43 connected to a circuit section which generates an a.c. voltage. There are advantages to using an a.c. voltage for this purpose, phased to the line supply of terminals 42A, 42B. At least one advantage is that connection of the line voltage to the load will be initiated only at the beginning of a half cycle of the line voltage i.e. at zero. Therefore, zero switching will be insured.

However, a d.c. voltage can be generated and applied to the gate of TRIAC 43. If the connection is not timed to the beginning of a half cycle of the a.c. voltage of the source, the connection during the half cycle will produce a voltage spike. If disconnection and reconnection take place rapidly under the automatic function of the controller 40, a destructive number of voltage spikes could result. If the disconnection and reconnection take place with relative infrequency, the number of voltage spikes may not seriously threaten the load transformer.

The point to be made is that the present disclosure is not to be viewed as limited to generation of an a.c. voltage for the gate of TRIAC 43. A specific illustration of a d.c. source is not employed, and for the purposes of disclosing the present invention, this illustration is not necessary.

Finally, let us turn to consideration of the output of controller 40 as connecting the load transformer 10 to the line supply of terminals 42A, 42B. It is well known that if transformer 10 itself is built to utilize reactance as a protective limitation of primary current, the power available to the load on the transformer is severely limited. It is not uncommon for this limitation to be 50% of the transformer rating. Thus, a 50KVA rated transformer may be necessary to supply a 25KVA load.

Ideally, it obviously is desirable to provide the standard distribution transformer to insure a close match between the rated KVA of the transformer and its actual KVA output. Without the automatic protection of reactance, it is necessary to disconnect this transformer from the line supply when the load requirement of the transformer exceeds the transformer rating. It is conventional to supply a circuit breaker for this disconnection. Unfortunately, for automatic operation, the circuit breaker must be reset manually.

The functions of controller 40 include those of a circuit breaker and provide "automatic resetting". However, it may be desirable, in the emperical assembly of these systems, to provide a modification to the power output of the load transformer with selected use of reactance units. The output circuit of controller 10 adapts well to incorporation of reactance units to give a wide choice of characteristics to the operational power cuve.

Figure 7:
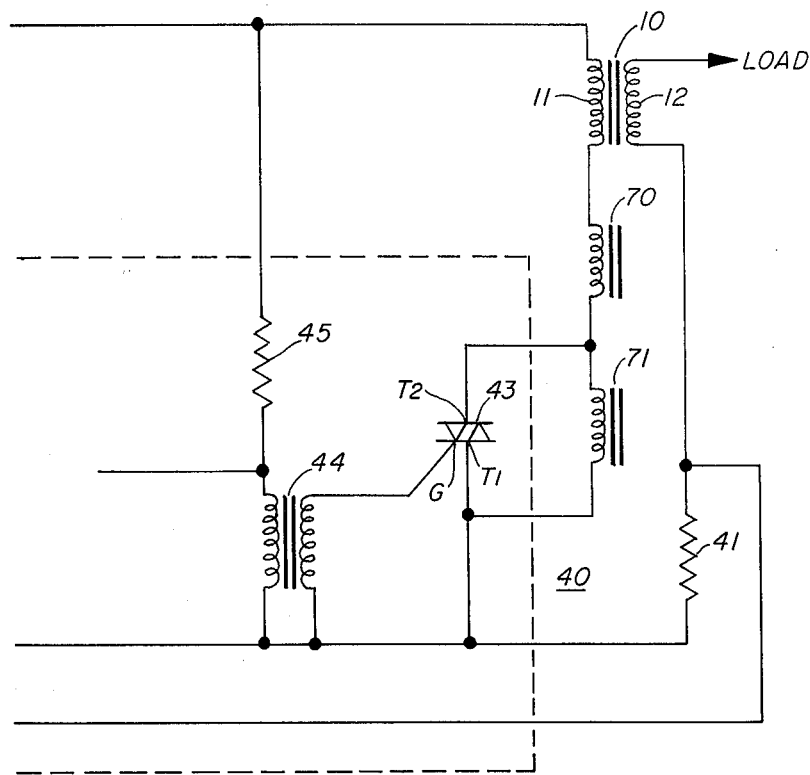
FIG. 7 is a schematic of a fragment of the circuit of FIG. 4 with reactance components to modify the output power curve.

Referring specifically to FIG. 7, there is disclosed a fragment of the circuit of FIG. 4 to which has been added reactors 70 and 71 in series with the primary 11 of transformer 10. Controller 40 is connected in parallel with reactor 71.

Figure 8:
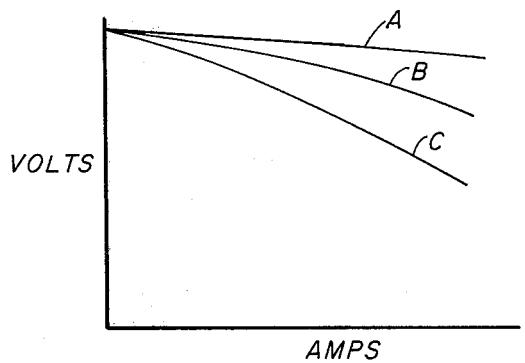
FIGS. 8 and 9 are power output curves of the circuit of FIG. 7.

During the period when the transformer 10 is connected to the source through the controller 40, the power curve is characterized by the size of reactance 70. The curves A, B and C of FIG. 8 illustrate a family of possible curves dependent upon specific sizes for reactance 70.

Figure 9:
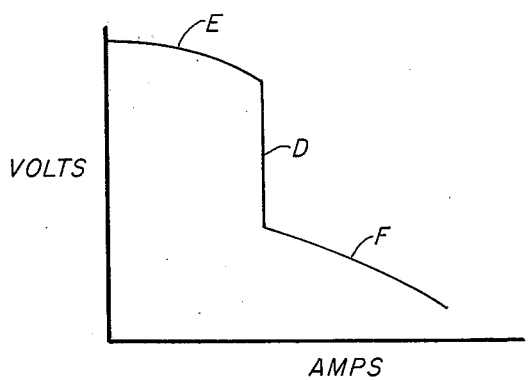

When the TRIAC 43 of controller 40 is rendered non-conductive by its gate signal, the current of the supply flows in series through reactors 70, 71 and primary 11 of transformer 10. The curve of FIG. 9 then illustrates the effect on the power curve shape when controller 40 becomes non-conductive at the current value at D. Curve portion E represents the influence of reactor 70 on the power curve and curve portion F represents the effect of both 70 and 71 on the power curve. Therefore, to one skilled in this art, it is evident that the curve of FIG. 9 can be changed by establishing specific values for 70 and 71 and the values of current at which controller 40 becomes non-conductive. Thus, the circuit designer has a tool with which the power curve can be given an indefinite number of shapes, or characteristics, to meet a wide range of load requirements.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system for supplying electrical power to a varying load, including,
a pair of a.c. power source terminals;
means adapted to connect the terminals to the load;
an electronic switch means in circuit between the terminals and the connecting means and having a gate electrode, the electronic switch responding to a gate drive signal generated from the a.c. power source to disconnect the terminals and connecting means for one half and multiples of one half cycle of alternate polarity of the a.c. source voltage and connect the terminals and connecting means at zero crossing of the a.c. source voltage for one half and multiples of one half cycle of alternate polarity of the source voltage;

a drive circuit generating and programming the gate drive signal and connected to the gate electrode of the electronic switch, including:
  a. A generator of the gate drive signal connected to the gate electrode and adapted to be connected to the a.c. power source,
  b. A disconnect circuit for effectively disconnecting the generator from the gate electrode in response to an electrical signal, the disconnect circuit connected to the generator and a source of power,
  c. And a delay section circuit to generate the programmed electrical signal to the disconnect circuit and connected to receive an input signal;

and means for sensing the current applied to the load as an input signal and connected to provide the input signal to the delay section of the drive circuit, whereby the source terminals are connected to the load at zero crossing of the a.c. source voltage for those intervals in which the power demanded by the load is within the continuous operative range of the components of the system and disconnected for one half and multiples of one half cycle of alternate polarity of the source voltage.

2. The system of claim 1, wherein,
the delay section of the drive circuit also includes:
  a. A potentiometer connected to the means for sensing the current applied to the load to receive the input signal with which to predetermine that magnitude of load current which will prevent generation of the gate drive signal and thereby disconnect the source terminals from the load,
  b. And inductor-capacitance and resistor-capacitance combinations connected between the potentiometer and the disconnect circuit and sized to predetermine the rate of generation of the electrical signal, the rate permitting development of a charge voltage for the load and to maintain the electrical signal generated for a length of time proportional to the magnitude of the sensed load current.

3. The system of claim 2, wherein,
the inductor has one end connected to the potentiometer and is in series with the capacitor and the resistor is connected in series with the capacitor at the junction of the inductor and the capacitor with its other end connected to the disconnect circuit for providing the gate drive signal.

4. The system of claim 2, wherein,
the means for sensing the load current includes:
  a. A resistor connected in series with the connecting means to develop a voltage across the resistor indicative of the load current,
  b. and conductor means including a full wave rectifier connecting the delay section circuit to apply the sensed current in the form of a d.c. voltage as the input signal.

5. The system of claim 1, wherein,
the generator of the drive circuit is a transformer with its primary operatively connected to the a.c. power source terminals and its secondary connected to the gate electrode of the electronic switch means for generating the gate drive signal in phase with the a.c. source.

6. The system of claim 5, wherein,
the generator-transformer is short circuited by the disconnect circuit which includes a second electronic switch means connected in parallel with the primary of the generator-transformer.

7. The system of claim 6, wherein,
the second electronic switch means is a silicon controlled rectifier and the short circuiting means further includes a full wave rectifier bridge connected intermediate the silicon controlled rectifier and the primary of the generator-transformer.

* * * * *